US005676326A

United States Patent [19]

Carpenter

[11] Patent Number: 5,676,326
[45] Date of Patent: Oct. 14, 1997

[54] FISHING REEL WITH MEMBER TO CONTROL LINE MIGRATION

[75] Inventor: Robert Leon Carpenter, Tulsa, Okla.

[73] Assignee: Zebco Division of Brunswick Corp., Tulsa, Okla.

[21] Appl. No.: 537,422

[22] Filed: Sep. 29, 1995

[51] Int. Cl.⁶ ................................................. A01K 89/01
[52] U.S. Cl. ................................. 242/319; 242/322
[58] Field of Search .............................. 242/319, 322

[56] References Cited

U.S. PATENT DOCUMENTS

| 2,884,211 | 4/1959 | Holahan, Jr. | 242/319 |
|---|---|---|---|
| 3,974,977 | 8/1976 | Kamikawa | 242/319 |
| 4,061,288 | 12/1977 | Karlsson et al. | 242/319 |
| 4,451,012 | 5/1984 | Puryear et al. | 242/319 |
| 5,294,074 | 3/1994 | Henriksson | 242/319 |
| 5,318,247 | 6/1994 | Sugawara | 242/319 |

Primary Examiner—Daniel P. Stodola
Assistant Examiner—Emmanuel M. Marcelo
Attorney, Agent, or Firm—Wood, Phillips, VanSanten, Clark & Mortimer

[57] ABSTRACT

A fishing reel having a body, a line carrying spool, first structure for mounting the line carrying spool to the body, a rotor, second structure for mounting the rotor to the body for movement relative to the body around an axis as an incident of which line is wrapped by the rotor around the line carrying spool, a line control member, and third structure cooperating between the line control member and at least one of the reel body, rotor and spool for a) maintaining the line control member in an operative position on the fishing reel and b) guiding movement of the line control member relative to both the rotor and the line carrying spool as the fishing reel is operated with the line control member in the operative position. The line control member limits movement of line on the line carrying spool axially relative to the spool between the spool and the rotor.

18 Claims, 2 Drawing Sheets

Fig. 1 (Prior Art)
Fig. 2 (Prior Art)
Fig. 4
Fig. 5
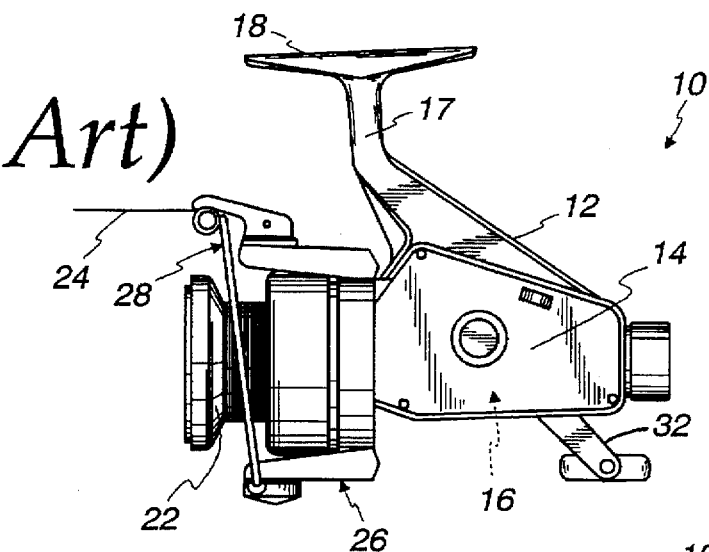
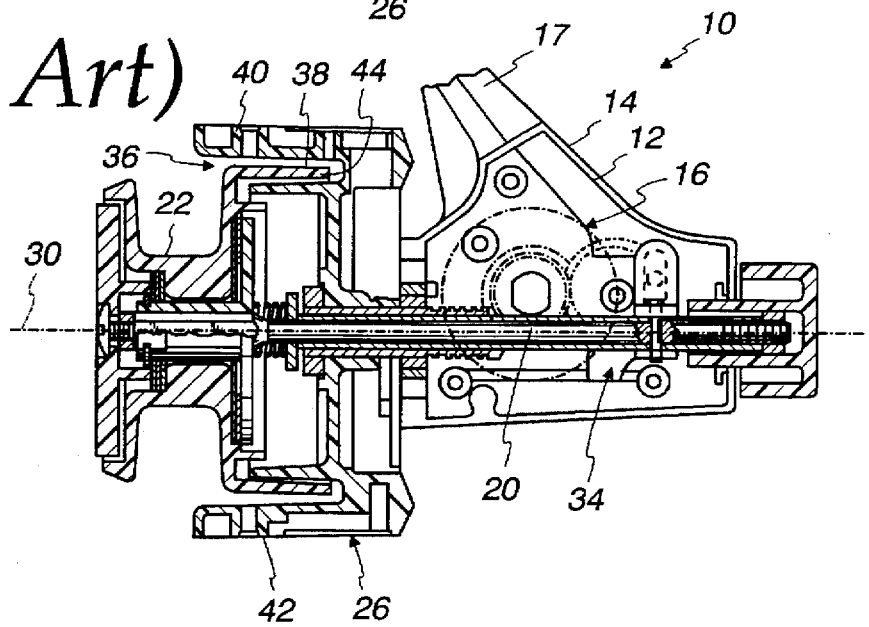
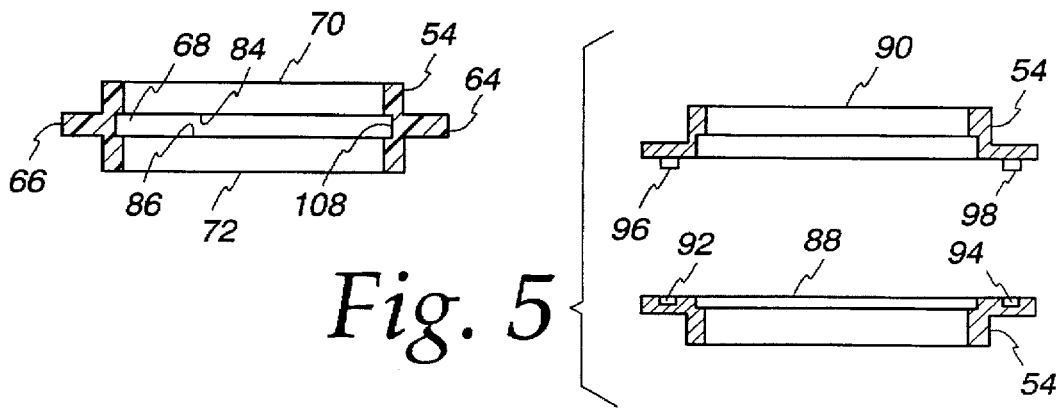

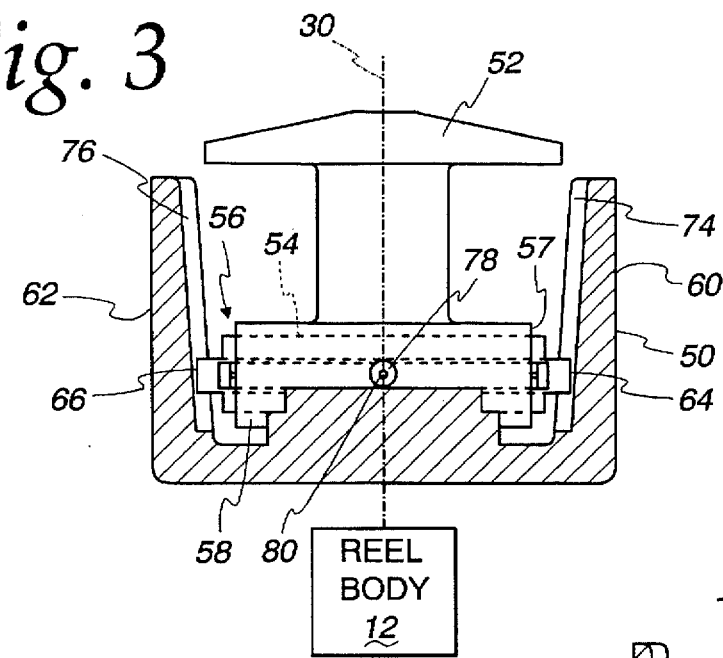
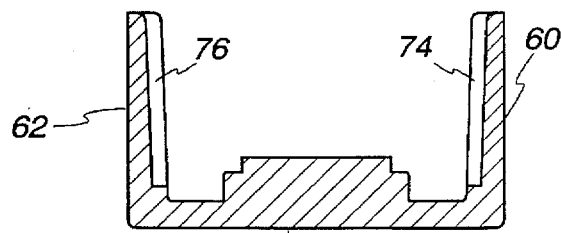
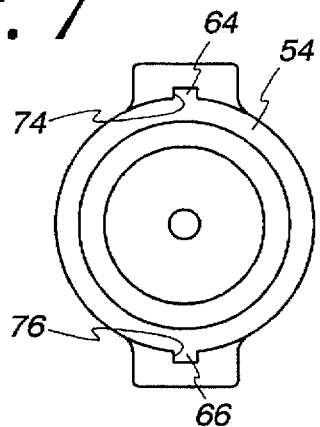
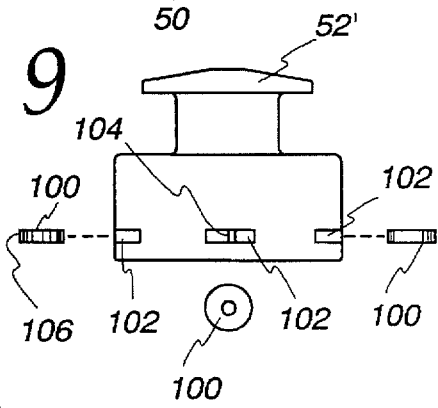
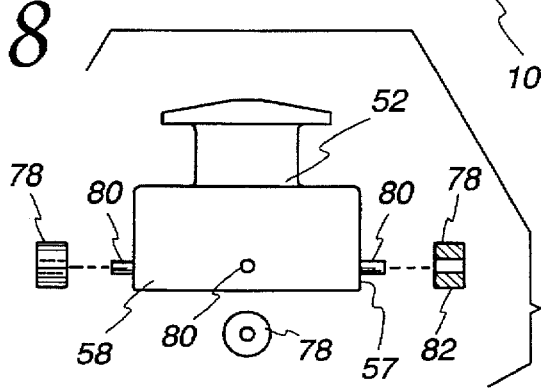

FISHING REEL WITH MEMBER TO CONTROL LINE MIGRATION

BACKGROUND OF THE INVENTION

1. Field of the Invention

This invention relates to fishing reels of the type having a line carrying spool with an axial extent and, more particularly, to a line control member that prevents migration of the fishing line over an axial end of the line carrying spool.

2. Background Art

In a spinning type fishing reel, a line carrying spool is mounted on the forward end of a reel body. Typically, the line carrying spool snaps to the forward free end of a center shaft. A rotor is concentrically mounted with the spool and carries a bail assembly for rotation therewith. The bail assembly is selectively positionable in a) a cast position, wherein line is allowed to pay freely off of the spool, and b) a retrieve position, wherein the bail wraps line around the spool as the rotor is operated. The rotor is typically operated through an external crank handle. As the crank handle operates, the center shaft and spool are caused to oscillate in a fore and aft direction. This accounts for an even axial distribution of line on the spool as the reel is operated.

One problem associated with this type of fishing reel is that fishing line tends to migrate around the rear axial end of the spool and wrap around the center shaft. With the line dram taut, this condition rarely occurs. However, during a cast and with the reel otherwise in a state wherein the line is slackened, the line may drift over the rear axial end of the spool, as a result of which further operation of the reel will cause wrapping of the line around the center shaft.

In a worst case, the line will break or be weakened to the point that the line will have to be cut out from the from of the reel. Oft times, this condition is detected before the line becomes significantly entangled. The user then simply unwraps the line. However, even if detected at an early stage, the line may become squeezed or nicked. While this condition is not readily detectable from an inspection of the line, the line may have a localized weakening which will cause it to fail under a force significantly less than that which it is designed to sustain.

While this condition is described in relationship to a spinning type fishing reel, the problem is not unique to this reel style. For example, spin cast reels are prone to the same problem.

Since fishing reels cannot practically be made with tolerances close enough to prohibit this line migration, it would be desirable to use some sort of line control in conjunction with the basic reel. However, to date, no such structure is known to the inventor herein that effectively controls this line migration without impairing reel operation.

SUMMARY OF THE INVENTION

In one form of the invention, a fishing reel is provided having a body, a line carrying spool, first structure for mounting the line carrying spool to the body, a rotor, second structure for mounting the rotor to the body for movement relative to the body around an axis as an incident of which line is wrapped by the rotor around the line carrying spool, a line control member, and third structure cooperating between the line control member and at least one of the reel body, rotor and spool for a) maintaining the line control member in an operative position on the fishing reel and b) guiding movement of the line control member relative to both the rotor and the line carrying spool as the fishing reel is operated with the line control member in the operative position. The line control member limits movement of line on the line carrying spool axially relative to the spool between the spool and the rotor.

The line control member may be an annular ring.

In one form, the third structure includes a radial projection on one of the rotor and spool and a radially extending seat on the other of the rotor and spool for receiving the projection.

The third structure may include a rotatable wheel on one of a) the line control member and b) the at least one of the reel body, rotor and spool and a guide surface against which the wheel rolls on the other of the c) line control member and d) the at least one of the reel body, rotor and spool.

The wheel has a rotational axis that is in one form parallel to the rotor axis and in another form at a right angle to the rotor axis.

The annular ring that defines the line control member may include first and second parts that can be connected together, with the third structure including an annular guide surface on one of the rotor and line control member and a guide element on the other of the rotor and line control member that moves guidingly in an annular path against the annular guide surface with the rotor and line control member operatively connected. With the first and second annular ring parts separated, the guide element can be placed against the annular guide surface. With the rotor and line control member operatively connected and the first and second annular ring parts connected, the other of the rotor and line control member is inseparable from the one of the rotor and line control member.

In one form, the fishing red includes structure for oscillating the spool in an axial direction as the rotor is operated. The rotor has first and second ears, with the first structure including diametrically opposite first and second projections on the annular ring and first and second seats formed one each on the first and second rotor ears for accepting the first and second projections and guiding the first and second projections and the annular ring axially of the rotor to allow the spool with the annular ring connected thereto to oscillate as the fishing reel is operated.

The third structure may be a plurality of wheels rotatably mounted to the line carrying spool and a surface on the line control member over which the wheels roll to thereby guide relative rotational movement between the spool and the line control member.

The line control member may be made from plastic.

The third structure may include at least one rotatable wheel cooperating between the line control member and line carrying spool to thereby guide relative rotational movement between the line carrying spool and line control member about an axis.

The wheel may be made from rubber.

In another form of the invention, a fishing reel is provided having a body, a line carrying spool having an axis and axially spaced ends, first structure for mounting the line carrying spool to the body for movement around the spool axis, a line control member, and second structure cooperating between the line control member and the line carrying spool for guiding relative movement between the line control member and the spool. The line control member limits movement of line on the line caroling spool axially relative to the spool past one of the axial ends of the spool.

BRIEF DESCRIPTION OF THE DRAWINGS

FIG. 1 is a side elevation view of a prior art spinning fishing reel;

FIG. 2 is an enlarged, lengthwise, cross-sectional view of the fishing reel of FIG. 1;

FIG. 3 is a cross-sectional view of a rotor and line carrying spool with a line control member, according to the present invention, operatively connected thereto;

FIG. 4 is a cross-sectional view of the line control member in FIG. 3;

FIG. 5 is an exploded, side elevation view of the line control member of FIG. 4;

FIG. 6 is a cross-sectional view of the rotor of FIG. 3 without the spool and line control member thereon;

FIG. 7 is a reduced, end elevation view of the rotor, line carrying spool and line control member in FIG. 3;

FIG. 8 is a reduced, exploded, side elevation view of the spool with wheels thereon that cooperate with the line control member to guide relative rotation between the spool and line control member; and FIG. 9 is a view as in FIG. 8 showing a modified form of wheel, according to the present invention.

DETAILED DESCRIPTION OF THE DRAWINGS

In FIGS. 1 and 2, a conventional spinning fishing reel is shown at 10. The fishing reel 10 is intended only to be exemplary of the different types of reels with which the present invention can be used. The operation of the fishing reel 10 will be described below to establish the environment for the invention, which is shown in detail in FIGS. 3-8.

The fishing reel 10 has a body 12 defining a housing 14 for a reel operating mechanism 16. The housing 14 blends into a stem 17 which terminates at a mounting foot 18, which can be attached to a rod (not shown) in conventional fashion.

A center shaft 20 extends in a fore and aft direction and mounts a line carrying spool 22 at its forward end. A supply of line 24 is wrapped around the spool 22 by a rotor 26 with a bail assembly 28 thereon. The rotor 26 and spool 22 are rotatable about the same fore and aft axis 30.

With the bail assembly 28 in the retrieve mode of FIG. 1, rotation of a crank handle 32, through the operating mechanism 16, effects rotation of the rotor 26 about the axis 30 and simultaneously, through an oscillating mechanism at 34, causes the center shaft 20 and spool 22 thereon to move reciprocatively in a fore and aft direction. The bail assembly 28 draws the line 24 in a wrapping motion around the spool 22. Due to the oscillation of the spool 22, the line 24 is evenly distributed along the axial extent of the spool 22. Further details of the reel operating mechanism 16 and oscillating mechanism 34 are described in detail in U.S. Pat. No. 5,040,743, incorporated hereby by reference.

With the line 24 slackened, as during a cast, the line may migrate through an annular space 36 between a spool flange 38 and diametrically opposite ears 40, 42 on the rotor 26. Eventually, the line 24 may migrate beyond the rear axial end 44 of the spool flange 38, whereupon it is permitted to move radially inwardly to contact the center shaft 20. Continued operation of the reel 10 may then cause the line 24 to coil around the center shaft 20 and become entangled between the spool 22 and rotor 26. Ultimately, the spool 22 may have to be removed to free the line 24. Even if the line 24 can be unwrapped, it is always possible that the line 24, upon becoming entangled, may be nicked or squeezed, so as to create a localized weakening.

The present invention obviates the above problem. The present invention, as shown in FIGS. 3-8, can be incorporated into the reel mechanism in FIGS. 1 and 2 by simply changing the rotor 26 and spool 22 thereon. The remainder of the reel 10 could be identical to that shown in FIGS. 1 and 2.

According to the invention, as shown in FIGS. 3-8, a rotor 50 and line carrying spool 52 are constructed so that a line control member 54 can be operatively connected between the rotor 50 and line carrying spool 52 to block migration of line through the annular region at 56 between the outer surface 57 of the spool flange 58 and the rotor ears 60, 62.

The line control member 54 is in the shape of an annular ring with diametrically opposite guide elements/projections 64, 66 thereon. A guiding groove 68 is defined mid-way between the axial ends 70, 72 of the line control member 54.

The projections 64, 66 are constructed to move one each in complementary seats 74, 76 that are radially undercut in the rotor ears 60, 62. The seats 74, 76 and projections 64, 66 have a complementary shape which allows the line control member 54 to move guidingly relatively to the rotor 50 in the line of the axis 30. At the same time, relative rotation between the line control member 54 and rotor 50 is limited by the projections 64, 66, which confront the circumferential surfaces bounding the seats 74, 76.

The spool 52 in turn cooperates with the line control member 54 so that the line control member 54 and spool 52 are guided in relative rotation around the axis 30. The means for accomplishing this guided relative movement between the spool 52 and line control member 54 includes four guide wheels 78 (three shown) carried rotatably upon stub shafts 80 projecting radially from the spool flange 58 at equidistantly spaced locations around the circumference of the flange 58. The line of projection of each shaft 80 is substantially perpendicular to the axis 30.

The wheels 78 have annular surfaces 82 which are designed to roll guidingly along axially spaced surfaces 84, 86 bounding the guiding groove 68. The arrangement of four wheels 78 stably supports the connection between the line control member 54 and the spool 52 and guides smooth relative rotation therebetween about the axis 30.

With this arrangement, the projections 64, 66 fully block the region 56 between the spool 52 and the rotor ears 60, 62 so that line cannot pass axially therethrough.

In operation, as the spool 52 oscillates, as previously described, the spool 52 and line control member 54 oscillate as a unit with the projections 64, 66 guiding this axial movement along the ears 60, 62 within the seats 74, 76. At the same time, the rotor 50 is allowed to freely spin with the line control member 54 relative to the spool 52 around the axis 30.

To facilitate assembly of the line control member 54, the line control member 54 is preferably made in two pans 88, 90, as shown in FIG. 5. The line control member parts 88, 90 are substantially identical with the exception of there being blind receptacles 92, 94 on the part 88 and posts 96, 98 on the part 90 to snap into the receptacles 92, 94 to maintain the parts 88, 90 together. The parts 88, 90 could be glued to enhance the integrity of this connection.

With this arrangement, the wheels 78 can be preassembled to the shafts 80. The line control mechanism parts 88, 90 can then be directed from axially oppositely ends of the spool 52 to captively embrace the wheels 78 within the guiding grooves 68 and thereafter fixed together.

In a preferred form, the line control member 54 is made from plastic. The wheels 78 can be made from rubber. The rubber wheels 78 will guide smoothly and quietly against the guide surfaces 84, 86 on the line control member 54.

As an alternative to having the wheels 78 mounted to rotate about an axis that is perpendicular to the fore and aft axis 30, wheels 100 can be mounted to a modified form of spool 52' to rotate about an axis that is substantially parallel to the fore and aft axis 30. To accomplish this, the spool 52' is undercut to define seats 102 for the wheels 100. The wheels 100 are rotatable about shafts 104 extending through the seat.

With the arrangement in FIG. 9, the peripheral surfaces 106 of the wheels 100 move guidingly against the radially inwardly facing surfaces 108 bounding the guiding groove 68 on the line control mechanism 54.

The foregoing disclosure of specific embodiments is intended to be illustrative of the broad concepts comprehended by the invention.

I claim:

1. A fishing reel comprising:

a body;

a line carrying spool;

first means for mounting the line carrying spool to the body;

a rotor;

second means for mounting the rotor to the body for movement relative to the body around a first axis as an incident of which line is wrapped by the rotor around the line carrying spool;

a line control member; and third means cooperating between the line control member and at least one of the reel body, rotor, and spool for a) maintaining the line control member in an operative position on the fishing reel and b) guiding movement of the line control member relative to both the rotor and the line carrying spool as the fishing reel is operated with the line control member in the operative position, said line control member limiting movement of line on the line carrying spool axially relative to the spool between the spool and the rotor, wherein the third means comprises at least one wheel on one of the line control member and the at least one of the reel body, rotor and spool, said at least one wheel having a second axis and an annular outer surface that faces radially outwardly relative to the second axis and rolls guidingly against the other of the line control member and the at least one of the reel body, rotor and spool as the rotor moves around the first axis.

2. The fishing reel according to claim 1 wherein the third means comprises a radial projection on one of the rotor and line control member and a radially extending seat on the other of the rotor and line control member for receiving the projection.

3. The fishing reel according to claim 1 wherein the line control member comprises an annular ring.

4. The fishing reel according to claim 1 wherein the second axis is parallel to the first axis.

5. The fishing reel according to claim 1 wherein the line control member comprises an annular ring, the annular ring comprises first and second parts with means for connecting the first and second annular ring parts together, the third means comprises an annular guide surface on one of the rotor and line control member and a guide element on the other of the rotor and line control member that moves guidingly in an annular path against the annular guide surface with the rotor and line control member operatively connected, with the first and second annular ring parts separated the guide element can be placed against the annular guide surface and with the rotor and line control member operatively connected and the first and second annular ring parts connected the other of the rotor and line control member is inseparable from the one of the rotor and line control member.

6. The fishing reel according to claim 1 wherein the fishing reel includes means for oscillating the spool in an axial direction as the rotor is operated, the line control member is an annular ring, the rotor has first and second ears and the third means comprises diametrically opposite first and second projections on the annular ring and first and second seats formed one each in the first and second rotor ears for accepting the first and second projections and guiding the first and second projections and the annular ring axially of the rotor to allow the spool with the annular ring connected thereto to oscillate relative to the rotor as the fishing reel is operated.

7. The fishing reel according to claim 1 wherein the line control member comprises a plastic material.

8. The fishing reel according to claim 1 wherein the wheel cooperates between the line control member and line carrying spool to thereby guide relative rotational movement between the line carrying spool and line control member about an axis.

9. The fishing reel according to claim 8 wherein the rotatable wheel axis is parallel to the rotor axis.

10. The fishing reel according to claim 8 wherein the rotatable wheel comprises rubber.

11. A fishing reel comprising:

a body;

a line carrying spool;

first means for mounting the line carrying spool to the body;

a rotor;

second means for mounting the rotor to the body for movement relative to the body around an axis as an incident of which line is wrapped by the rotor around the line carrying spool;

a line control member; and third means cooperating between the line control member and at least one of the reel body, rotor, and spool for a) maintaining the line control member in an operative position on the fishing reel and b) guiding movement of the line control member relative to both the rotor and the line carrying spool as the fishing reel is operated with the line control member in the operative position, said line control member limiting movement of line on the line carrying spool axially relative to the spool between the spool and the rotor, wherein the third means comprises a rotatable wheel on one of a) the line control member and b) the at least one of the reel body, rotor and spool and a guide surface against which the wheel rolls on the other of the a) line control member and b) the at least one of the reel body, rotor and spool, wherein the wheel has a rotational axis that is substantially at a right angle to the rotor axis.

12. A fishing reel comprising:

a body;

a line carrying spool;

first means for mounting the line carrying spool to the body;

a rotor;

second means for mounting the rotor to the body for movement relative to the body around an axis as an incident of which line is wrapped by the rotor around the line carrying spool;

a line control member; and third means cooperating between the line control member and at least one of the reel body, rotor, and spool for a) maintaining the line control member in an operative position on the fishing reel and b) guiding movement of the line control member relative to both the rotor and the line carrying spool as the fishing reel is operated with the line control member in the operative position, said line control member limiting movement of line on the line carrying spool axially relative to the spool between the spool and the rotor, wherein the third means comprises a plurality of wheels rotatably mounted to the line carrying spool and a surface on the line control member over which the wheels roll to thereby guide relative rotational movement between the spool and the line control member.

13. A fishing reel comprising:

a body;

a line carrying spool having an axis and axially spaced ends;

first means for mounting the line carrying spool to the body for movement thereof around the spool axis;

a line control member; and second means cooperating between the line control member and the line carrying spool for guiding relative movement between the line control member and line carrying spool, said line control member limiting movement of line on the line carrying spool axially relative to the spool past one of the axial ends of the spool, wherein the second means comprises a rotatable wheel cooperating between the line control member and the line carrying spool, said wheel being rotatable around an axis that is not coincident with the spool axis.

14. The fishing reel according to claim 13 wherein the rotatable wheel axis is substantially parallel to the line carrying spool axis.

15. The fishing reel according to claim 13 wherein the line control member comprises an annular ring.

16. The fishing reel according to claim 13 including means cooperating between the line control member and the reel body for guiding movement of the line control member relative to the reel body.

17. The fishing reel according to claim 13 wherein the second means comprises a guide element on the spool and an annular guide surface for the guide element on the line control member.

18. A fishing reel comprising:

a body;

a line carrying spool having an axis and axially spaced ends;

first means for mounting the line carrying spool to the body for movement thereof around the spool axis;

a line control member; and second means cooperating between the line control member and the line carrying spool for guiding relative movement between the line control member and line carrying spool, said line control member limiting movement of line on the line carrying spool axially relative to the spool past one of the axial ends of the spool, wherein the second means comprises a rotatable wheel cooperating between the line control member and the line carrying spool for guiding relative movement between the line control member and line carrying spool, wherein the rotatable wheel has an axis and the rotatable wheel axis is substantially perpendicular to the line carrying spool axis.

* * * * *